United States Patent [19]

Förnsel et al.

[11] Patent Number: 4,740,860
[45] Date of Patent: Apr. 26, 1988

[54] METHOD FOR GENERATING A TRIPPING SIGNAL AS A FUNCTION OF THE MAGNITUDE AND DURATION OF AN OVERCURRENT

[75] Inventors: Helmut Förnsel; Hans-Eberhard Simmel, both of Karlsruhe, Fed. Rep. of Germany

[73] Assignee: Siemens Aktiengesellschaft, Munich, Fed. Rep. of Germany

[21] Appl. No.: 874,287

[22] Filed: Jun. 13, 1986

[30] Foreign Application Priority Data

Jun. 21, 1985 [DE] Fed. Rep. of Germany ....... 3522739

[51] Int. Cl.⁴ .............................................. H02H 3/093
[52] U.S. Cl. ......................................... 361/94; 361/87; 364/483
[58] Field of Search ....................... 361/87, 93, 94, 96, 361/97; 364/483

[56] References Cited

U.S. PATENT DOCUMENTS

| 4,017,766 | 4/1977 | Vercellotti et al. | 361/94 X |
| 4,219,860 | 8/1980 | DePuy | 361/96 X |
| 4,291,355 | 9/1981 | Dinger | 361/96 X |

FOREIGN PATENT DOCUMENTS 2047995 12/1980 United Kingdom .

Primary Examiner—A. D. Pellinen
Assistant Examiner—Derek S. Jennings
Attorney, Agent, or Firm—Kenyon & Kenyon

[57] ABSTRACT

A method for generating a tripping signal in dependence on an overcurrent, in which sampled measurement values are converted into digital values. These values are weighted and summed in accordance with a predetermined function. A tripping signal is formed if a predetermined sum value is reached. In order to cause in such a method the delivery of a tripping signal only for true overcurrents, and in order to prevent the delivery of a tripping signal when an overcurrent is decaying and below a threshold, the summation is cancelled while the overcurrent is decaying, immediately in dependence on the waveform of the overcurrent. The digital values of the respective last period of time corresponding to at least one half-period of the overcurrent are stored and a comparison of all the then stored digital values with each other is made. At a determined highest stored value below a predetermined threshold, the summation is cancelled.

3 Claims, 1 Drawing Sheet

METHOD FOR GENERATING A TRIPPING SIGNAL AS A FUNCTION OF THE MAGNITUDE AND DURATION OF AN OVERCURRENT

BACKGROUND OF THE INVENTION

The present invention relates to a method for generating a tripping signal as a function of the magnitude and the duration of an overcurrent, in which a measurement variable which is derived from the overcurrent is rectified and sampled, the sampled measurement values are converted into corresponding digital values, the digital values of a given function are weighted accordingly and summed, the tripping signal is formed at a sum value above a given reference value, and the summing is cancelled before the tripping signal is formed if the overcurrent falls below a given threshold for a certain time.

A known monitoring equipment operates according to such a method which is described in DE-OS No. 29 50 031. See also U.S. Pat. No. 4,219,860 or G.B. No. 2,037,104. In this known monitoring equipment, a measurement variable obtained by rectification from the current to be monitored is sampled by means of a sampling circuit and the sampling values so obtained are converted into corresponding digital values in an A/D converter. The digital values are weighted in a function generator and are added up after being weighted in an adding circuit. If the content of the adding circuit reaches a predetermined reference value, a tripping signal is generated. In the known monitoring equipment, a circuit module is connected to the A/D converter, by which the current is continuously checked to determine if it has overcurrent values. As long as this is the case, a clock-controlled counter which is connected to the circuit module is continuously reset. If the resetting signal of the circuit module fails to arrive (the current is below overcurrent values), the clock-controlled counter runs up to a preset counter reading and then resets the adding circuit. So that resetting of the adding circuit does not occur merely because the instantaneous values of the waveform of the rectified measurement variable fall below a value characterized as an overcurrent, the counter must be designed in the known monitoring equipment in such a manner that this predetermined counter reading can be reached only after a time which is longer than the duration of a half-wave of the current to be monitored. This can lead to a situation that in an isolated case, tripping still takes place without a need for it. In any case, the known monitoring equipment operating according to the method described for currents of 50 or 60 Hz requires counters set differently with respect to the critical counter readings.

SUMMARY OF THE INVENTION

It is an object of the present invention to provide a method for generating a tripping signal as a function of the magnitude and the duration of an overcurrent, in which the instant of the cancellation of the additional process depends, for a decaying overcurrent, directly on the wave shape of the measurement variable and thus takes place independently of the frequency of the current to be monitored for overcurrent values after, for instance, a half-wave of the current to be monitored.

The above and other objects of the present invention are achieved by a method for generating a tripping signal for operating a circuit interrupter in dependence on the magnitude and duration of an overcurrent comprising the steps of:

sampling a rectified measurement variable derived from the overcurrent and converting the sampled measurement values into corresponding digital values;

weighting the digital values, summing the values according to a predetermined function and forming the tripping signal if the sum exceeds a comparison value; and cancelling the summing process before the tripping signal is formed if the overcurrent falls below a predetermined threshold for a period of time; and further comprising the steps of:

storing the digital values of the respective last period of time which corresponds to at least one half period of the overcurrent;

comparing all stored digital values with each other and determining the largest stated value; and further comprising:

a further step of comparing the largest stored value determined in the first step of comparing with a quantity below the predetermined threshold, the step of cancelling further comprising cancelling the summation if the largest stored value is below the predetermined threshold.

Accordingly, for achieving the objects of the invention, the digital values of the respective last time period corresponding at least to a half-period of the overcurrent, are stored, and a comparison of all the digital values then stored is made, upon a maximum stored value determined in the comparison with a quantity set below the predetermined threshold, the summation is cancelled.

A substantial advantage of the method according to the invention consists in that an equipment operating according to this method can be designed independently of the frequency of a current to be monitored for overcurrent values because cancelling the adding or clearing the added-up values with a decaying overcurrent is not brought about by means of a counter counting up to a preset counter reading, but takes place if, after overcurrent values are stored, a value is determined for the first time due to the comparison as the highest stored value which is below a predetermined threshold and does not represent an overcurrent value. As a rule this will be the case for the crest value of a first half-wave which is below the predetermined threshold. Therefore, cancellation of the summation takes place always in dependence on the actual waveform of the measurement variable.

In the method according to the invention, the comparison of the respective then stored digital values can take place at different rates. If a method is desired which operates particularly accurately, it is advantageous to make a comparison of all the then stored digital values with each other for every newly stored digital value. In this manner the summation can be cancelled immediately if no value is found among the simultaneously stored digital values which is above the preset threshold, so that a tripping signal is then not generated erroneously.

If all the then stored digital values are compared with each other for each newly stored digital value, this requires, in the practical execution, a relatively large effort; this means that in the practical execution of the method according to the invention, generally including a microcomputer, this microcomputer must have a relatively large computing capacity.

The method according to the invention can be carried out in this respect with less effort if, according to another embodiment, a comparison of all the then stored digital values with each other is carried out at a rate which is lower than the sampling rate by which the rectified measurement variable is sampled. In this case, a less capable microcomputer can be used for carrying out the method. However, it must be taken into consideration that, if possible, still other sampled measurement values are weighted and added up, so that in the limit, the addition process may be cancelled less rapidly than required.

BRIEF DESCRIPTION OF THE DRAWINGS

The invention will now be explained in greater detail in the following detailed description with reference to the drawings, in which.

DETAILED DESCRIPTION

Figure 1:
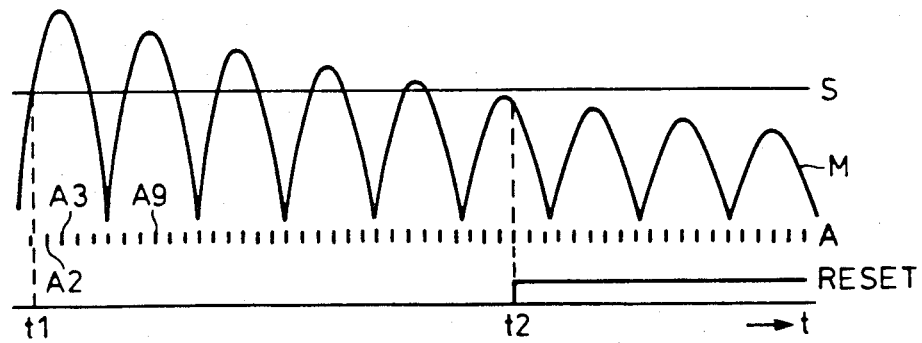
FIG. 1 is a diagram showing a rectified measurement value which is obtained from the current to be monitored.
Figure 2:
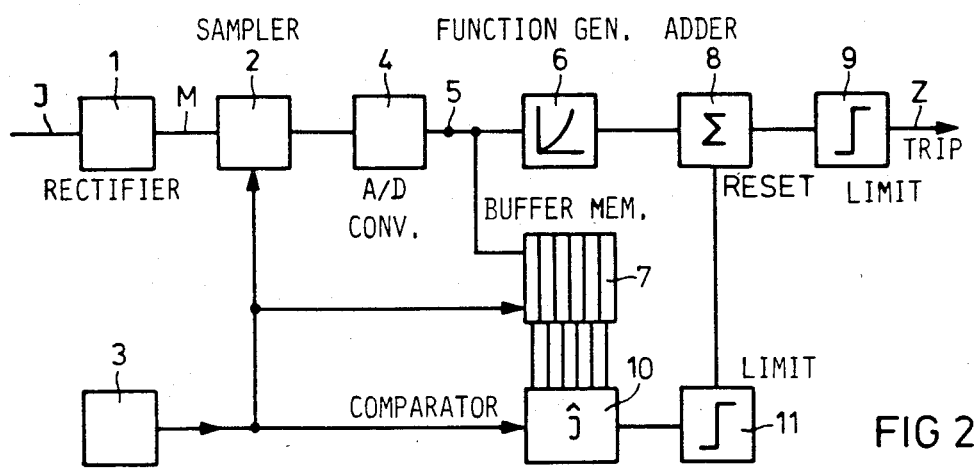
FIG. 2 is a block diagram of an apparatus for practicing the invention.

As shown in FIG. 2, a current J which is to be monitored as to its magnitude for the occurrence of an overcurrent is fed, in carrying out the method according to the invention, to a rectifier arrangement 1 which may be a full-wave rectifier. If the current J is a single-phase current, a measurement value M is generated at the output of the rectifier arrangement 1, the waveform of which is shown in FIG. 1. It is assumed in FIG. 1 that the measurement quantity M changes from initial values which characterize an overcurrent and are therefore above a threshold S, to values which are below the predetermined threshold S, as shown in FIG. 1.

The rectifier arrangement 1 is followed by a sampling device 2 which is connected to a clock generator 3. The rectified measurement variable M is consequently sampled at a sampling rate which is given by the frequency of the clock generator 3. To the output of the sampling device 2 is connected an analog-digital converter 4, to the output 5 of which a function generator 6 as well as a buffer memory 7 are connected.

In the function generator 6, the measurement values present in digital form are weighted in accordance with a predetermined function which can be described by the equation $f = J^2 \times t$, where t designates time. The function generator 6 is followed by an adder 8 in which the weighted values are summed. By means of a following limit stage 9, the content of the adder 8 is checked to determined if it has reached a predetermined limit; if this is the case, the limit stage 9 responds and generates a tripping signal Z. The limit stage 9 is set so that electrical equipment to be monitored for an overload, such as a motor, is not damaged.

The sampled measurement values in digital form also are fed to the buffer memory 7, while the clock generator 3 insures that every sampled measurement value which occurs in digital form at the output of the A/D converter 4 is stored as the respectively most current value in the buffer memory 7. To the buffer memory 7 is connected a comparator arrangement 10 which compares all sampled values stored in the buffer memory 7 with each other. These simultaneously stored measurement values are therefore those latest sampled values, the number of which corresponds to the number of storage locations in the buffer memory 7. The comparison of the respective measurement values stored simultaneously is made at a rate, controlled by the clock generator 3, which corresponds to the sampling rate. This means that with each newly stored digital value, a comparison of all digital values stored simultaneously in the buffer memory 7 with each other is performed. The comparison arrangement 10 is followed by a limit module 11. On the output side, the limit module 11 is connected to a resetting input of the adder 8. In this manner, it is achieved that the respectively highest stored value determined by comparison in the comparison arrangement 10 is compared to the predetermined threshold S in limit stage 11. If it is below the threshold S, limit stage 11 responds and delivers a reset signal to the adder 8, whereupon the adder 8 is reset to zero. Unless a tripping signal Z has already been generated, the generation of the tripping signal is thus prevented.

The operation of the method according to the invention will be explained in greater detail in the following, making further reference to FIGS. 1 and 2.

If the current J to be monitored or the measurement value M derived therefrom exceeds the predetermined threshold S, an excitation circuit, not shown in the figure, is made to respond; with a current waveform as shown in FIG. 1, this occurs at the time t1. The measurement value sampled by the sampling pulse A2 is thereupon stored in the buffer memory 7 as the first measurement value and is at the same time, after being weighted in the function generator 6, held in the adder 8. The same occurs for the following sample pulses. The crest value of the first half-wave of the measurement value M is stored with the sampling pulse A3. Then, further sampling values are stored sequentially in the buffer memory 7 for further sampling pulses. If it is assumed as an example that the buffer memory 7 has six storage locations, the value in the buffer memory 7 stored with the sampling pulse A3 is cancelled and a new value is stored as the largest measurement value in the buffer memory 7 upon the sampling pulse A9. During the time when the largest crest value was stored as well as during the time in which the second largest crest value is stored, the comparison arrangement 10 determines as the largest stored value the corresponding crest value, and the limit module 11 connected thereto does not respond, in the example shown, because the current values supplied to it are above the predetermined threshold S.

This applies up to the time t2, because the value sampled at that time is below the predetermined threshold S and the value stored up to this point which is just still above the predetermined threshold S is cleared in the buffer memory 7. A reset signal is consequently generated at the time t2 by the limit module 11 and thereby, the adder 8 is cleared and the summation is cancelled. Further summation in the adder 8 cannot take place.

If on the other hand, the measurement value M has values deviating from the waveform shown, which are above the threshold S beyond the time t2, then the adder 8 reaches a status, at which the tripping signal Z is delivered.

Figure 3:
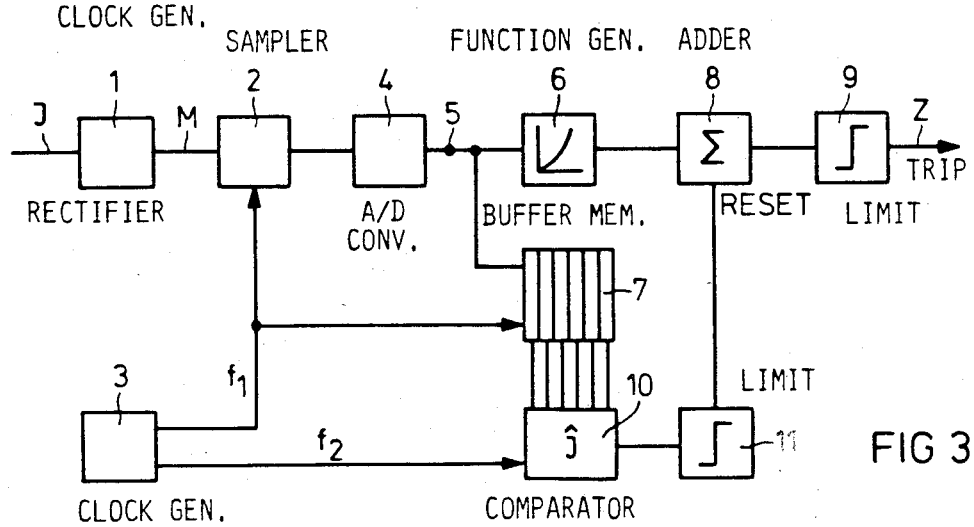
FIG. 3 is a further block diagram of apparatus for practicing the invention.

In the block diagram shown in FIG. 3, a further apparatus for practicing the method according to the invention is explained. The block diagram shown in FIG. 3 differs from that shown in FIG. 2 only by the fact that the sampling device 2 as well as buffer memory 7 are then controlled by a frequency f1 of the clock generator 3. The rate, at which a comparison of all simultaneously stored digital values is made with each other, is given by the frequency f2 of the clock generator. This frequency f2 is lower than the frequency $f_1$. If the number of storage locations in the buffer memory 7 is designated with n and the frequency of the current J to be monitored is $f_N$, then the following relationships are found in a rectifier arrangement in the manner of a full-wave rectifier:

$$n \geq \frac{1}{2} \times \frac{f_1}{f_N}; \quad (1)$$

$$n \geq \frac{f_1}{f_2} \quad (2)$$

With this embodiment of the method according to the invention, the requirements in a practical embodiment as to the buffer memory and the comparator arrangement are relatively low, so that in the preferred embodiment of the method according to the invention with a microcomputer, the performance requirements to be set by a microcomputer are relatively low. This advantage is counterbalanced with respect to the measuring accuracy by a resulting slight disadvantage because due to the rate at which the comparison of the respective stored measurement values are carried out, it cannot be ensured that the reset signal actually occurs at the time t2, as measured by the conditions shown in FIG. 1. A shift by several sampling pulses can occur.

Otherwise, the method according to the invention as shown in the embodiment of FIG. 3, proceeds exactly as was described in detail in conjunction with the explanation of FIGS. 1 and 2.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for generating a tripping signal for operating a circuit interrupter in dependence on the magnitude and duration of an overcurrent comprising the steps of:

sampling a rectified measurement variable derived from the overcurrent and converting the sampled measurement values into corresponding digital values;

weighting the digital values, summing the values according to a predetermined function and forming the tripping signal if the sum exceeds a comparison value; and cancelling the summation before the tripping signal is formed if the overcurrent falls below a predetermined threshold for a period of time; and further comprising the steps of:

storing the digital values of the respective last period of time corresponding to at least one half-period of the overcurrent;

comparing in a first step of comparing the stored digital values with each other and determining the largest stored value; and further comprising a further step of comparing the largest stored value determined in the first step of comparing with said predetermined threshold, said step of cancelling further comprising cancelling the summation if the largest stored value is below the predetermined threshold.

2. The method recited in claim 1, wherein said first step of comparing comprises comparing all stored digital values with each other.

3. The method recited in claim 1, wherein said first step of comparing comprises comparing all the stored digital values with each other at a rate which is lower than the sampling rate at which the recitified measurement variable is sampled.

* * * * *